United States Patent [19]

Tanaka et al.

[11] Patent Number: 5,087,132
[45] Date of Patent: Feb. 11, 1992

[54] BEARING HAVING BEARING SURFACE OF CLOTH

[75] Inventors: Kouji Tanaka; Masaaki Ikeda; Yasumasa Tsubakimoto, all of Osaka; Takashi Koizumi, Nara; Takerou Nakagawa; Makato Kanehira, both of Osaka, all of Japan

[73] Assignee: Tsubakimoto Chain Company, Osaka, Japan

[21] Appl. No.: 636,019

[22] Filed: Jan. 4, 1991

Related U.S. Application Data

[63] Continuation of Ser. No. 292,948, Jan. 3, 1989, abandoned.

[51] Int. Cl.[5] .................... F16C 33/20; F16C 33/02
[52] U.S. Cl. ........................... 384/276; 384/298; 384/625; 384/909

[58] Field of Search ............... 384/276, 625, 911, 908, 384/909, 297-300, 42; 427/294

[56] References Cited

U.S. PATENT DOCUMENTS 4,464,432  8/1984  Dost ............................ 427/246
4,737,383  4/1988  Matsumae et al. ............ 427/294

FOREIGN PATENT DOCUMENTS 4929955  8/1974  Japan .

Primary Examiner—Thomas R. Hannon
Attorney, Agent, or Firm—Woodling, Krost & Rust

[57] ABSTRACT

A method for manufacturing a resin impregnated cloth bearing surface wherein the resin impregnated cloth is deaerated to reduce air bubbles in the finished bearing.

18 Claims, 2 Drawing Sheets

BEARING HAVING BEARING SURFACE OF CLOTH

This is a continuation of co-pending application Ser. No. 07/292,948 filed on Jan. 3, 1989 now abandoned.

INDUSTRIAL APPLICABLE FIELD

This invention relates to a bearing having a bearing surface of cloth and the method of manufacturing same.

PRIOR ART

A conventional bearing having a bearing surface of cloth is, as shown in Japan Patent Publication Gazette No. 29955/1974, manufactured by impregnating a cloth with a low viscosity resin under the atmospheric pressure, forming it such that it has a bearing surface, and thermally curing the impregnated resin.

PROBLEMS TO BE SOLVED BY THE INVENTION

In the above-mentioned prior art, in order that the cloth may not contain air, a low viscosity resin is utilized so that the resin may fill the gaps of the fibers of the cloth by the so-called capillary phenomenon. However, since the cloth is soaked into the liquid resin under the atmospheric pressure, the air contained in the cloth tends to be introduced into the liquid resin along with the cloth; and becomes entrapped in the form of bubbles between the cloth fibers as well as in the liquid resin itself. These bubbles tend to burst when a load is applied to the bearing surface; and the burst results in the wear of the bearing surface. Thus, the load capacity of such a bearing is low; and the service life is rather short because of the wear.

The object of the present invention is to provide a bearing having a bearing surface of cloth which has a property of low friction, high load capacity and good resistance by eliminating air bubbles in the bearing surface in contradistinction to the prior art as mentioned earlier. This invention also relates to a method of manufacturing such a bearing.

MEANS FOR SOLVING THE PROBLEM

In order to achieve the above-mentioned object, according to the present invention, a bearing is manufactured as follows:

Namely, deaerating each of a liquid resin and a cloth under negative pressure; impregnating said deaerated cloth with said deaerated liquid resin under the same atmosphere, thus obtaining a cloth impregnated with resin having no air bubbles; taking the resin-impregnated cloth out of said atmosphere and forming it such that it has a bearing surface; and curing the impregnated resin.

FUNCTION

The cloth impregnated with the resin under negative pressure does not contain air bubbles, so that the above-mentioned bursting phenomenon of bubbles is unlikely to occur, thereby preventing wear due to the burst. Moreover, the cloth placed under negative pressure may be completely deaerated; and similarly, any air bubbles which may be present in the liquid resin come to the surface and disappear as a result of being placed under negative pressure. Furthermore, since the cloth is immersed into the liquid resin under negative pressure, air is unlikely to be entrained into the resin. Therefore, it is possible to obtain a completely deaerated cloth impregnated with resin.

The cloth may be made solely of low friction fibers, such as fluorocarbon resin fibers, or as a mixture of such fibers and other fibers. A cloth comprising low friction fibers may provide an excellent bearing surface of low friction. In addition, if the liquid resin contains a solid lubricant, such a graphite, molybdenum disulfide, polytetrafluoroethylene (Teflon, etc., the resin after thermal curing may have a low coefficient of friction.

EMBODIMENTS

Hereinafter, embodiments of the present invention will be described with reference to the accompanying drawings.

FIGS. 1–3 show perspective views of annular bearings according to this invention in which:

FIG. 1 is a bearing in which an inner surface is a bearing surface;

FIG. 2 is a bearing in which an outer surface is a bearing surface;

FIG. 3 is a bearing in which both inner and outer surfaces are bearing surfaces;

FIGS. 4 and 5 illustrate perspective views of flat bearings according to this invention in which:

FIG. 4 is a bearing in which one surface is a bearing surface; and

FIG. 5 is a bearing in which both obverse and reverse sides are bearing surfaces.

ADVANTAGES OF INVENTION

According to the present invention, since the bearing surface is formed by a cloth impregnated with resin having no air bubbles, bursting of air bubbles will not occur when a load is applied to the bearing. Thus, the wear of the bearing surface may be remarkably reduced and load capacity may be increased.

If the cloth is made of low friction fibers, friction may be reduced. Moreover, if a solid lubricant is contained in the impregnated resin, a sliding property of the bearing surface can be made smoother.

Furthermore, since the bearing surface is made of cloth, it is easy to form an annular or flat bearing surface as the case may be, which means that bearings may be formed for rotational or linear motions. It is also advantageous that bearings may be thin and light.

Finally, deaeration of both the cloth and the liquid resin under negative pressure and immersion of the cloth into the resin under negative pressure eliminates the possibility of air being entrained into the resin. Consequently, it is possible to obtain a cloth impregnated with resin having no air bubbles, as the resin can infiltrate into the fibers of the cloth without substantially lowering the viscosity of the liquid resin.

Figure 1:
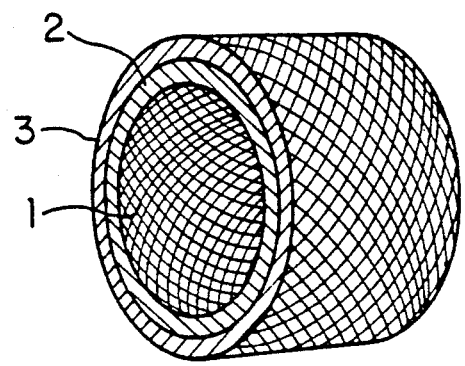
Figure 2:
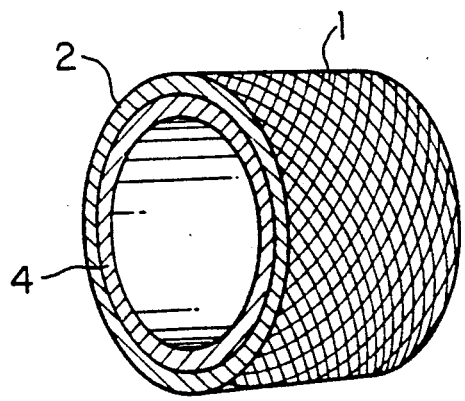
Figure 3:
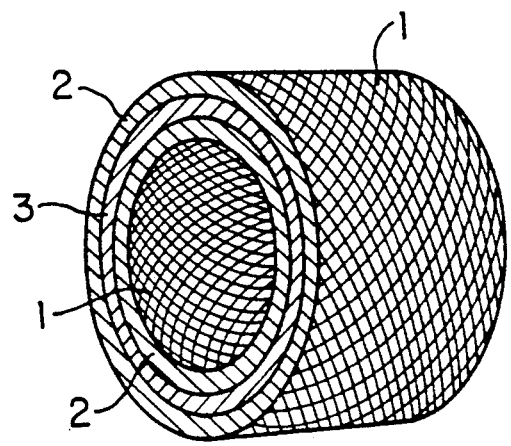

FIG. 1 depicts an annular bearing in which an inner surface 1 serves as a bearing surface; in FIG. 2, an outer surface is a bearing surface 1; and in FIG. 3, both inner and outer surfaces are bearing surfaces 1,1.

With reference to FIG. 1, a deaerated cloth 2 of fluorocarbon resin fibers impregnated with resin (preferably an epoxy resin) is closely wound or fixed around a mandrel (not shown); and around the cloth 2, a supporting layer 3 is formed by applying a liquid resin (also preferably an epoxy resin) reinforced by, for example, glass fibers mixed in the form of long filaments, or by winding fibers impregnated with liquid resin, or by winding a union cloth impregnated with a liquid resin. The impregnated resin cures and solidifies as heat is applied; or may be left for a predetermined period of time; and the cloth 2 and the layer 3 become bonded together.

After curing, the mandrel is removed; and the product is machined to finish the outer diameter to the predetermined size; and cut into pieces having the desired lengths.

Instead of forming a supporting layer 3 around the cloth 2, the cloth 2 may be directly bonded to an internal surface of a bearing receiving member (not shown). In this case, the internal surface of the receiving member will be provided with a surface treatment so that a liquid resin may easily adhere thereto; and the cloth 2 is caused to be bonded to the internal surface as the resin cures.

In order to form a bearing surface 1 on the outer surface as shown in FIG. 2, a bearing receiving member, such as a pipe 4, is first prepared and given a similar surface treatment. Then, a similarly deaerated cloth impregnated with a liquid resin is wound and the resin is similarly cured. Bondage between the two members takes place similarly. And a similar machining may be carried out.

Furthermore, in case it is necessary to form bearing surfaces 1,1 to both the inner and outer surfaces, a further cloth 2 with impregnated liquid resin is wound around the supporting layer 3 shown in FIG. 1; and curing of resin is carried out simultaneously with respect to the two inner and outer cloths.

Figure 4:
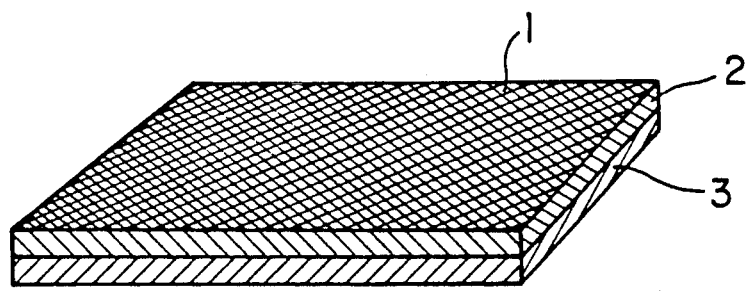
Figure 5:
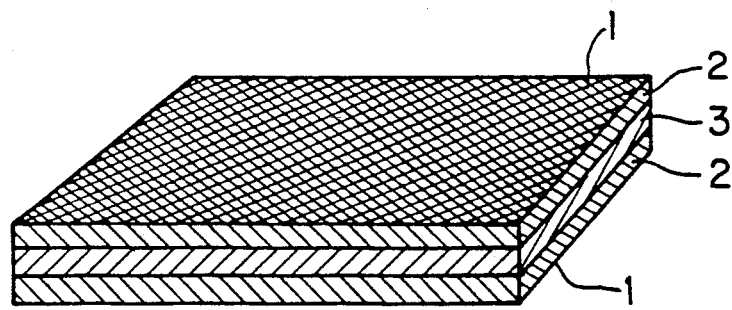

In the next place, FIG. 4 shows a flat bearing having a bearing surface 1 on one side thereof; and FIG. 5 illustrates a flat bearing which has bearing surfaces 1, 1 on both the obverse and reverse sides. In these cases, the bearing surface 1 functions as a sliding surface.

A deaerated cloth 2 impregnated with a resin and a supporting layer 3 are pressed together by flat molding means (not shown); and they are bonded as the resin cures.

In addition, in place of the supporting layer 3, the cloth 2 may be directly bonded to a suitable bearing receiving member having a flat shape.

The invention has been described in detail with particular emphasis on the preferred embodiments thereof, but it should be understood that variations and modifications within the spirit and scope of the invention may occur to those skilled in the art to which the invention pertains.

What is claimed is:

1. A bearing surface of a deaerated cloth impregnated with deaerated resin with both such cloth and such resin being aerated prior to impregnation with the resin.

2. The bearing of claim 1 wherein the cloth comprises low friction fibers.

3. The bearing of claims 1 or 2 wherein the resin is a liquid resin containing a solid lubricant.

4. The bearing of claim 3 wherein the bearing surface is annular.

5. The bearing of claim 3 wherein the bearing surface is flat.

6. The bearing surface of claims 1 or 2 wherein the bearing surface is annular.

7. The bearing of claims 1 or 2 wherein the bearing surface is flat.

8. In a bearing having a hardened impregnated cloth bearing surface the improvement of the resin and cloth being individually deaerated under a negative pressure prior to impregnation and hardening.

9. The improved bearing of claim 8 characterized in that the cloth includes low friction fibers.

10. The improved bearing of claim 8 characterized in that the resin contains a solid lubricant.

11. A bearing having a bearing surface of a cloth deaerated under a negative pressure prior to being impregnated with a liquid resin deaerated under a negative pressure.

12. The bearing of claim 11 wherein the liquid resin contains a solid lubricant.

13. The bearing of claim 12 wherein the solid lubricant includes at least one of graphite, molybdenum disulfide, or polytetrafluoroethylene.

14. The bearing of claim 11 wherein the deaerated cloth was impregnated with the deaerated liquid resin under a negative pressure.

15. The bearing of claim 11 wherein the cloth includes fluorocarbon resin fibers.

16. A bearing having a bearing surface of a fluorocarbon resin fiber cloth deaerated under a negative pressure prior to being impregnated under a negative pressure with a liquid resin deaerated under a negative pressure.

17. The bearing of claim 16 wherein the liquid resin contains a solid lubricant.

18. The bearing of claim 17 wherein the solid lubricant includes at least one of graphite, molybdenum disulfide, or polytetrafluoroethylene.

* * * * *